United States Patent [19]

Voss

[11] Patent Number: 4,629,967

[45] Date of Patent: Dec. 16, 1986

[54] GENERATOR VOLTAGE REGULATOR

[75] Inventor: Richard J. Voss, Kokomo, Ind.

[73] Assignee: General Motors Corporation, Detroit, Mich.

[21] Appl. No.: 727,557

[22] Filed: Apr. 29, 1985

[51] Int. Cl.⁴ .............................................. H02J 7/16
[52] U.S. Cl. ....................................... 322/28; 322/33; 322/34; 322/17; 320/35; 320/39; 320/64
[58] Field of Search ....................... 322/17, 28, 33, 34; 320/35, 36, 39, 40, 64

[56] References Cited

U.S. PATENT DOCUMENTS

| | | | |
|---|---|---|---|
| 3,539,864 | 11/1970 | Harland et al. | 322/28 |
| 3,599,079 | 8/1971 | Ansbro | 322/23 |
| 4,310,793 | 1/1982 | Sheldrake | 322/28 |
| 4,470,003 | 9/1984 | Mitchell | 322/33 X |

Primary Examiner—Peter S. Wong
Assistant Examiner—Mark D. Simpson
Attorney, Agent, or Firm—C. R. Meland

[57] ABSTRACT

A voltage regulating system for a diode-rectified alternating current generator that supplies the electrical loads on a motor vehicle including charging the storage battery. The voltage regulator has a reference voltage developing circuit that can operate either in a temperature compensated mode or a flat mode. In the temperature compensated mode the reference voltage developed by the circuit varies with temperature and while the circuit is in the flat mode the reference voltage remains substantially constant with changes in temperature. The voltage regulator has a switching transistor connected in series with the field winding of the generator which can operate in a current limiting mode in the event that sensed field current becomes excessive. The voltage regulator includes circuitry for ensuring that the output voltage of the generator properly builds-up when the field winding is initially excited by the battery.

8 Claims, 1 Drawing Figure

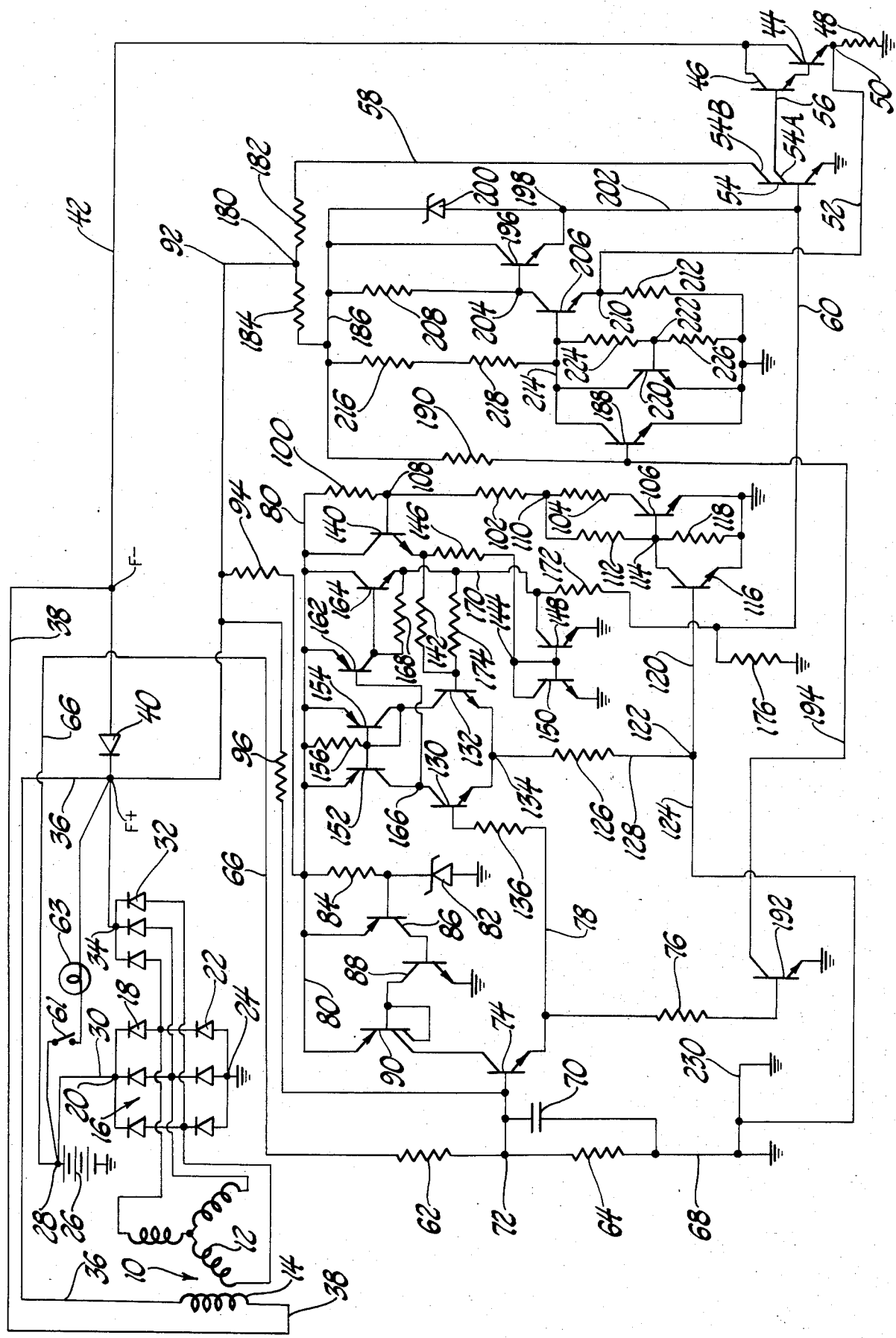

GENERATOR VOLTAGE REGULATOR

This invention relates to generator voltage regulators and more particularly to a generator voltage regulator for controlling the field current of a diode-rectified alternating current that supplies the electrical loads on a motor vehicle including the vehicle storage battery.

Voltage regulators, for maintaining the output voltage of a diode-rectified alternating current generator at a desired regulated value for charging the storage battery of a motor vehicle, are well known to those skilled in the art. In one type of regulator, for example for use on vehicles where the battery is not in the engine compartment with the generator, the regulator is arranged such that the regulated voltage does not vary with variations in temperature. This type of regulator has what may be termed a flat response and is some times called a flat compensated regulator. In another type of regulator, for example for use on passenger cars, the regulated voltage is varied with changes in temperature. This type of regulator can be termed a temperature compensated regulator and it causes the regulated output voltage of the generator, which is applied to the battery, to be lower at warmer temperatures than it is at cold temperatures.

In order to satisfy the need for both flat and temperature compensated types of regulators it has been necessary, for the regulator manufacturer, to provide both types of regulators and each regulator has different components in regard to voltage reference developing circuitry. Thus, in a flat response regulator a voltage can be developed by a resistive voltage divider whereas in a temperature compensated regulator the voltage divider must contain some type of circuit element that has a characteristic that varies with temperature.

One of the objects of this invention is to provide a generator voltage regulator that can operate in a flat response mode or a temperature compensated mode and wherein the mode can be selected by making or not making an electrical connection in the regulator. More specifically, the regulator of this invention has a reference voltage developing voltage divider comprised of a plurality of resistors and a first transistor. The base-emitter voltage of the first transistor varies with temperature and when the regulator is in the temperature compensated mode the first transistor cooperates with the resistors to provide a reference set point voltage that varies with temperature. A second transistor is provided which, when biased conductive, disables the control effect of the first transistor and connects the resistors in a voltage divider circuit. The voltage developed across this voltage divider circuit does not vary substantially with temperature and accordingly this voltage can now be used as a reference voltage to provide a flat response mode. When a conductor, connected to the base of the second transistor, is connected to ground the regulator is set to operate in the temperature compensated mode. When this conductor is not connected to ground the regulator is set to operate in the flat response mode. Accordingly, it is a simple matter to provide a single regulator that can be of the temperature compensated type or of the flat response type.

Another object of this invention is to provide an improved generator voltage regulator wherein field current is controlled by a transistor connected in series with the field winding of the generator and wherein the transistor is switched on and off to control field current and further wherein the transistor is biased out of its saturated switched on condition whenever the collector-emitter current of the transistor exceeds a value that corresponds to a fault condition such as a shorted field winding. This is accomplished by a small resistor that is connected in series with the collector-emitter circuit of the transistor which develops a voltage that is a function of field current. The voltage developed across the resistor can control the bias of the transistor such that when this voltage exceeds a certain value the conduction of the transistor is reduced and the transistor then operates in a current limiting mode.

Another object of this invention is to provide a voltage regulating system for a diode-rectified alternating current generator that supplies the electrical loads on a motor vehicle including charging the storage battery wherein the regulator has circuitry for ensuring that the output voltage properly builds up after the field winding is initially excited from the battery.

IN THE DRAWINGS

The single FIGURE drawing is a schematic circuit diagram of a motor vehicle electrical system that has a voltage regulator made in accordance with this invention.

Referring now to the drawing, the reference numeral 10 generally designates an alternating current generator which has a three-phase Y-connected stator or output winding 12 and a field winding 14. The three-phase output winding 12 is connected to the AC input terminals of a three-phase full-wave bridge rectifier generally designated by reference numeral 16. The bridge rectifier 16 is comprised of three positive diodes 18 having their cathodes connected to a positive direct voltage output terminal 20. The bridge rectifier further has three negative diodes 22, the anodes of which are connected to a grounded junction 24 that forms another direct voltage output terminal for the bridge rectifier 16.

The alternating current generator may be, for example, of the type that is disclosed in the Cheetham et al. U.S. Pat. No. 3,538,362. The field winding 14 is carried by the rotor of the generator and is connected to slip rings in a manner disclosed in the Cheetham et al. patent. The rotor of the generator is driven by the internal combustion engine of a motor vehicle in a manner well known to those skilled in the art. The direct voltage output developed between junctions 20 and 24 is utilized to supply the electrical loads on a motor vehicle, including charging the storage battery 26. The battery 26 has a negative terminal that is grounded and a positive terminal that is connected with junction 28. The junction 28 is connected to the positive direct voltage output terminal 20 of the bridge rectifier 16 by conductor 30.

The purpose of the voltage regulator, of this invention, is to maintain a desired regulated output voltage from the diode-rectified alternating current generator that has been described. It will be assumed, in the further discussion of this invention, that the electrical system is a 12 volt system so that, for example, a regulated voltage of 14 volts will be maintained between junction 28 and ground. The desired regulated voltage, as will be described, may be varied with temperature.

The electrical system has three diodes 32, the anodes of which are connected to the AC input terminals of the bridge rectifier 16 and the cathodes of which are connected to a junction 34. The three diodes 32 are some times referred to as a diode trio and they provide a voltage between junction 34 and ground which energizes certain parts of the voltage regulator. The junction 34 is connected to a junction identified as F+. This junction is connected to a conductor 36 which in turn is connected to one side of field winding 14. The opposite side of field winding 14 is connected to a conductor 38 which in turn is connected to a junction identified as F−. A free-wheeling or field discharge diode 40 is connected across terminals F+ and F− and hence across field winding 14. The terminal F− is connected to a conductor 42. The conductor 42 is connected to a pair of Darlington connected NPN transistors 44 and 46. The emitter of transistor 44 is connected to ground via a small resistor 48 of approximately 0.01 ohms. One end of the resistor 48 is connected to a junction 50 which in turn is connected to a conductor 52.

As will be more fully described hereinafter, the Darlington connected transistors 44 and 46 are switched on and off in order to control the current through field winding 14 to thereby control the output voltage of generator 10. The field circuit for energizing field winding 14 can be traced from junction 34 to the F+ terminal, through conductor 36 and through field winding 14, through conductors 38 and 42 and then through the collector-emitter paths of the Darlington connected transistors 44 and 46 and finally through the small resistor 48 to ground. The resistor 48, during this switching action, develops a voltage that is applied to conductor 52 and this voltage, under certain fault conditions, will cause the Darlington transistors 44 and 46 to be pulled out of saturation to thereby limit the current flowing through these transistors. The conduction of transistors 44 and 46 is controlled by a driver NPN transistor 54, one collector 54A of which is connected to the base of transistor 46 via conductor 56. The emitter of transistor 54 is grounded and the other collector 54B of this transistor is connected to conductor 58. The base of transistor 54 is connected to a conductor 60. As will be described, the voltage on conductor 60 is varied to cause the transistor 54 to switch on and off. When transistor 54 is nonconductive, transistors 46 and 44 are biased fully conductive or saturated and when transistor 54 is fully conductive or saturated transistors 44 and 46 are biased nonconductive.

A manually operable switch 61, which may be the ignition switch of a motor vehicle, and a generator tell-tale signal lamp 63 are connected in series between junction 28 and the F+ terminal.

The voltage regulator of this invention has a voltage dividing sensing circuit comprised of resistors 62 and 64. The resistor 62 may be 20K ohms and the resistor 64 about 12K ohms. This voltage sensing circuit is connected across the battery 26 and includes the conductor 66 that is connected to junction 28 and conductor 68, which is grounded. A capacitor 70 is connected across resistor 64. The voltage sensing circuit develops a divided-down voltage at junction 72 which is a function of the voltage appearing between junction 28 and ground.

The junction 72 is connected to the base of an NPN transistor 74 which operates in conjunction with a 10K ohm resistor 76 as an emitter follower amplifier. Accordingly, the emitter voltage of transistor 74, which is applied to conductor 78, is a voltage which is substantially the same as the voltage appearing at junction 72. Thus, the voltage on conductor 78 is normally lower than the voltage at junction 72 by the amount of voltage across the base-emitter of transistor 74, which may be about 0.6 volts. The voltage on conductor 78 may be termed the battery sense voltage since it follows the voltage of junction 28. As will be more fully described hereinafter, the voltage on conductor 78 is compared with a set point reference voltage in order to control the switching of field controlling transistors 44 and 46. Thus, when the voltage on conductor 78 is below some predetermined reference value, transistors 44 and 46 are biased conductive and when this voltage rises above the predetermined value, transistors 44 and 46 are biased nonconductive.

The voltage regulator of this invention utilizes a shunt voltage regulator which prevents the voltage on conductor 80 from rising above a predetermined regulated value, for example 6.7 volts in a 12 volt system. The shunt regulator comprises a Zener diode 82, a resistor 84, PNP transistor 86, and NPN transistor 88. A double collector PNP transistor 90 has its emitter connected to conductor 80. It can be seen that one of the collectors of transistor 90 is connected to the collector of transistor 74 and the other collector of transistor 90 is connected to its base. The base of transistor 90 is connected to the collector of transistor 88.

In regard to the operation of the shunt regulator, if the voltage at conductor 80 tries to increase, the forward base-emitter bias to transistor 86 increases. This increases the collector current of transistor 86 which in turn increases the collector current of transistor 88 to keep the voltage on conductor 80 from rising and at a desired regulated value of 6.7 volts.

The conductor 80 is connected to conductor 92 by a 1.2K ohm resistor 94 and conductor 92 is also connected to the base of transistor 74 by a feedback resistor 96 which may have a resistance of 125K ohms.

The voltage regulator of this invention includes circuitry for developing a set point reference voltage which is compared to a voltage that is a function of battery voltage in order to control the switching action of transistors 44 and 46. As will be more fully described, this reference voltage developing circuit is capable of providing a reference voltage that does not vary substantially with changes in temperature and is capable of providing a reference voltage that does vary with temperature. The voltage reference circuit comprises series connected resistors 100, 102 and 104. The collector and emitter electrodes of an NPN transistor 106 are connected between one end of resistor 104 and ground. The resistors 100 and 102 are connected to a junction 108 which develops the reference voltage. The resistor 102 is also connected to junction 110 and resistor 112 connects junction 110 to junction 114. The junction 114 is connected to the base of transistor 106 and to the collector of an NPN transistor 116. The emitter of transistor 116 is connected to ground and a resistor 118 is connected between junction 114 and ground.

The base of transistor 116 is connected to a conductor 120 which in turn is connected to junction 122 and to a conductor 124. The junction 122 is connected to one side of resistor 126 by a conductor 128. In the drawing, the conductor 124 is shown as being grounded. When manufacturing the voltage regulator of this invention, a conductor 124 will be either connected to ground, as shown in the drawing, or will be completely disconnected from the ground. When the conductor 124 is grounded, as illustrated in the drawing, the voltage reference circuit will be set in a mode of operation which will cause the voltage at junction 108 to vary with temperature. This type of voltage reference generation will be utilized where the particular motor vehicle system requires a temperature compensated voltage regulator. On the other hand, if the motor vehicle requires a so-called flat mode of operation, where the reference voltage does not vary as a function of temperature, the conductor 124 is not connected to ground or in other words is disconnected from ground.

Considering first, the so-called flat mode of operation where the conductor 124 is disconnected, it can be seen that the voltage on conductor 128 will be applied to the base of transistor 116 via conductor 120. This voltage is sufficient to bias transistor 116 to a fully saturated condition which causes the junction 114 to approach ground potential. With transistor 116 conductive, transistor 106 is biased nonconductive. Under this condition of operation, the voltage reference circuit comprises a simple voltage divider that includes resistor 100, resistor 102 and resistor 112, all of which are now series connected between conductor 80 and ground. The voltage appearing between conductor 80 and ground is regulated by the shunt regulator which has been described. Accordingly, a substantially constant voltage is developed at junction 108 which does not vary substantially with changes in temperature. The voltage at junction 108 can then be compared to a voltage that is representative of battery voltage to control switching of transistors 44 and 46. The voltage regulator will now be operating in what may be termed a flat compensated mode and the voltage applied to battery 26, accordingly, will not vary with changes in temperature.

The reference voltage developing circuit, when switched into the temperature compensated mode, provides a voltage when the temperature is colder than a predetermined cold temperature that does not vary as the temperature of the circuit becomes colder than the predetermined cold temperature and provides a lower voltage when the temperature of the circuit exceeds a predetermined hot temperature that does not vary as the temperature of the circuit becomes hotter than the predetermined hot temperature. Between these hot and cold temperature extremes the voltage developed by the reference voltage developing circuit varies substantially linearly with changes in temperature such that the voltage that is developed decreases as temperature increases and the voltage increases as temperature decreases. A curve of the voltage developed by the voltage reference circuit versus temperature has two substantially flat portions at two different voltage values corresponding respectively to temperatures at and below the cold temperature and at and above the hot temperature with the voltage between the flat portions defining a line that varies linearly with temperature and with a predetermined slope.

If it is desired that the reference voltage generating circuit provide a temperature compensated voltage reference, the conductor 124 will be connected to ground when the voltage regulator is manufactured. With conductor 124 grounded, the transistor 116 is biased nonconductive in its collector-emitter circuit, and the voltage at junction 108 will now vary with changes in temperature over a predetermined temperature range. In this mode of operation, the transistor 106 and resistors 112, 118 and 104 form a base-emitter multiplier. The circuit produces a voltage at junction 110 that is substantially equal to the base-emitter voltage of transistor 106 multiplied by a factor that is equal to the sum of the resistances of resistors 112 and 118 divided by the resistance of resistor 118. The ratio of the resistance values of resistors 118 to resistor 112 determines the slope in the active or linear region of the voltage reference curve that is developed by this circuit. As the temperature of the voltage reference circuit decreases the temperature responsive base-emitter voltage necessary for transistor 106 to conduct will increase. The maximum voltage available to the base of transistor 106 is determined by the resistor ratio of the resistance of resistor 118 divided by the sum of the resistance values of resistors 100, 102, 112 and 118. At some low temperature, the voltage available will be less than the voltage required by transistor 106 and transistor 106 will then cease to conduct. When the temperature decreases sufficiently to cause transistor 106 to go into cutoff, the curve of voltage versus temperature flattens out. At this point, the reference voltage at junction 108 is determined only by the resistors 100, 102, 112 and 118. As the temperature rises, the temperature responsive base-emitter voltage of transistor 106 decreases and the collector current of transistor 106 increases in an attempt to hold the junction 110 to the proper multiple of the base-emitter voltage of transistor 106. However, resistor 104 limits current that can be drawn and forces transistor 106 into saturation at some high temperature. When the temperature increases, such that transistor 106 starts to saturate, the voltage set point curve again flattens out. At this point the reference voltage is determined by resistors 100, 102, 112, 118 and 104 and the base-emitter voltage of transistor 106.

The voltage regulator of this invention utilizes an operational amplifier voltage comparator for comparing battery voltage with the reference voltage to thereby control the switching of transistors 44 and 46. This voltage comparator comprises NPN transistors 130 and 132. The emitters of these transistors are connected to junction 134 which in turn is connected to one side of resistor 126. The base of transistor 130 forms the non-inverting input of the operational amplifier and it is connected to conductor 78 via resistor 136. The base of transistor 130, accordingly, has a voltage applied thereto that represents battery voltage.

The base of transistor 132 forms the inverting input of the operational amplifier and it is connected to the emitter of an NPN transistor 140 by resistor 142. The base of transistor 140 is connected to junction 108 and its collector is connected to conductor 80. The emitter of transistor 140 is connected to junction 144 by a resistor 146. The junction 144 is connected to the base of NPN transistor 148 and to the base of NPN transistor 150 which is connected to form a diode that is connected between junction 144 and ground. Transistor 140 together with resistor 146 form an emitter follower amplifier that applies the reference voltage at junction 108 to the base of transistor 132.

The operational amplifier comparator includes PNP transistors 152 and 154 the emitters of which are connected to conductor 80. The base and collector of transistor 154 are electrically connected so that transistor 154 operates as a diode. A resistor 156 is connected between conductor 80 and the base electrodes of transistors 152 and 154. The collectors of transistors 130 and 132 are connected respectively to the collectors of transistors 152 and 154 and transistors 130 and 132 operate into a current mirror load provided by transistors 152 and 154.

The operational amplifier comparator has a PNP transistor 162 and an NPN transistor 164. The emitter of transistor 162 is connected to conductor 80 as is the collector of transistor 164. The base of transistor 162 is connected to the collector of transistor 130 at junction 166. The collector of transistor 162 is connected to the base of transistor 164. A resistor 168 connects the collector of transistor 162 and the emitter of transistor 164.

The emitter of transistor 164 is connected to conductor 60 via conductor 170 and resistor 172. A resistor 174 is connected between the base of transistor 132 and conductor 170. A resistor 176 of, for example, 6.5K ohms is connected between conductor 60 and ground.

The operational amplifier that has been described compares the voltage at the emitter of transistor 74 (battery voltage) with the voltage at the emitter of transistor 140 (reference voltage). If the battery voltage is higher than the reference voltage transistor 164 is biased conductive to supply base drive to transistor 54 via conductor 170, resistor 172 and conductor 60 to bias transistor 54 conductive. With transistor 54 fully conducting or saturated the voltage of collector 54A of transistor 54 is lowered to a point where transistors 46 and 44 are biased nonconductive. The collector voltage for transistor 54 is supplied to collector 54B by a conductor 58 which in turn is connected to a junction 180 via a 400 ohm resistor 182. The junction 180 is fed from conductor 92 that is connected to the F+ terminal. When battery voltage is below the reference voltage, transistor 164 is biased nonconductive to remove base drive from transistor 54 and consequently transistors 46 and 44 are biased fully conductive or saturated. This is due to the fact that when transistor 54 is biased nonconductive the voltage of collector 54A is increased to a level sufficient to bias transistors 46 and 44 fully conductive. The transistor 148 and the diode connected transistor 150 form a current mirror that provides active pull down for the output of the operational amplifier. This is necessary to enable complete cutoff of transistor 54 when battery voltage is lower than the reference voltage. Without the pull down function a small leakage current in transistor 162 could be amplified in transistor 164 and consequently turn on transistor 54 when it should be completely turned off.

The operational amplifier that has been described can have a closed loop gain of approximately 19 and acts as a moderately slow voltage comparator. The resistor 174 is the feedback resistor for the operational amplifier and may have a resistance of 20K ohms.

The voltage regulator of this invention includes sense shutdown circuitry for biasing the field current controlling transistors 46 and 44 nonconductive in the event that battery sensing conductor 66 becomes disconnected from junction 28 and for at times placing transistors 46 and 44 in a current limiting mode which will now be described. The junction 180 is fed by conductor 92 and a 6.2K ohm resistor 184 connects junction 180 to conductor 186. The conductor 186 is connected to the base of an NPN transistor 188 through resistor 190. The base of transistor 188 is also connected to the collector of an NPN transistor 192 by a conductor 194. The base of transistor 192 is connected to resistor 76 and its emitter is grounded.

An NPN transistor 196 has its collector connected to conductor 186 and its emitter connected to junction 198. An avalanche diode 200, which has a predetermined reverse breakdown voltage, is connected between conductor 186 and junction 198. The junction 198 is connected to conductor 60 and to the base of transistor 54 by a conductor 202. The base of transistor 196 is connected to junction 204 and to the collector of an NPN transistor 206. A resistor 208 connects conductor 186 and junction 204.

The emitter of transistor 206 is connected to a junction 210 and to junction 50 by conductor 52. A resistor 212 connects the junction 210 to ground. The base of transistor 206 is connected to conductor 214. The resistors 216 and 218 connect conductors 186 and 214. An NPN transistor 220 has its emitter connected to ground and its collector connected to conductor 214. The base of transistor 220 is connected to junction 222 located between resistors 224 and 226.

During normal operation, the conductor 66 is connected to junction 28 and the voltage at junction 72 and on conductor 78 is sufficient to bias transistor 192 conductive thereby connecting the conductor 194 substantially to ground. With transistor 192 conductive transistor 188 is biased nonconductive causing transistor 206 to be biased conductive and transistor 196 nonconductive. Under this condition of operation normal voltage regulation will occur.

If the voltage at junction 72 drops below some value, for example 1.5 volts, which will occur if conductor 66 is disconnected from junction 28, the transistor 192 will be biased out of its normal saturated state. This allows resistor 190 to bias transistor 188 to a saturated conductive state. With transistor 188 saturated, transistor 206 will be cut off and transistor 196 will be saturated thereby biasing transistor 54 to a saturated conductive state. Since transistor 54 is conductive, field current controlling transistors 46 and 44 are biased nonconductive to cut off field current. Without this sense shutdown feature, which cuts off field current, a disconnection of conductor 66 from junction 28 would cause transistors 46 and 44 to be biased continuously conductive with the result that there would be continuous field current and the generator would develop an undesirable high overvoltage.

As previously mentioned, the field current passes through the small resistor 48. If this field current exceeds a predetermined value the voltage developed across resistor 48 will cause transistors 46 and 44 to be biased out of saturation and into a current limiting mode. The voltage developed at junction 50 is applied to junction 210. Transistor 220 and resistors 224 and 226 form a base-emitter multiplier. The voltage at the collector of transistor 220 may be set to approximately 1.1 times the base-emitter voltage of transistor 220 or approximately 70 millivolts more than necessary to bias transistor 206 on. With transistor 206 biased fully on or saturated transistor 196 is biased off.

Assuming the voltage values just described, if the voltage applied to the emitter of transistor 206 from junction 50 increases by approximately 70 millivolts, which is a result of excessive field current, transistor 206 will begin to turn off. As transistor 206 turns off, the base voltage to transistor 196 will increase until transistor 196 turns on and supplies base drive to transistor 54. When transistor 54 starts to conduct, the base drive to output transistors 46 and 44 is decreased to reduce the collector current of the Darlington connected transistors 46 and 44 to a predetermined value. Thus, during excessive field current the transistors 46 and 44 are pulled out of saturation and are biased to an amount of conduction that limits field current to a predetermined value that will not destroy the output Darlington. One cause of excessive field current is a shorted field. The base-emitter multiplier has a negative temperature coefficient similar to the negative temperature coefficient of the field current that flows through field coil 14. Thus, the resistance of the field coil 14 will increase with increasing temperature as will the resistance of other conductors that energize the field. The negative temperature coefficient of the base and emitter of transistor 220 compensates for the temperature dependent variation of the resistance of the field circuit including the field winding so that current limiting action will occur at a lower field current as temperature increases to thereby provide maximum protection for the output Darlington 46 and 44.

In regard to the emitter follower amplifiers 74 and 140 it is pointed out that the load resistors connected to the emitters of these transistors are equal. The geometries of these transistors are identical and both of these transistors connect to the base of a transistor that has a grounded emitter (transistors 192 and 148). Transistors 74 and 140 accordingly have equal current densities and equal base-emitter voltage behavior over temperature.

The purpose of avalanche breakdown diode 200 is to cause the shutoff of field current if the voltage between the F+ terminal and ground exceeds a predetermined value, for example 25 volts in a 12 volt system. The reverse breakdown voltage of diode 200 may be approximately 7.8 volts and the circuit components can have such values that when the voltage on the F+ terminal reaches 25 volts a voltage in excess of 7.8 volts is applied to reverse voltage breakdown diode 200 to cause it to conduct in a reverse direction. When diode 200 breaks down transistor 54 will be biased into saturation causing the Darlington connected transistors 46 and 44 to be biased off to shutoff field current. With field current shutoff the output voltage will drop permitting the Darlington output transistors to switch back to a conductive state when diode 200 resumes its nonconducting state. During this mode of operation the output voltage is limited to a value of about 25 volts which is low enough not to destroy the regulator components. This high voltage condition could occur if conductor 30 became disconnected from bridge rectifier output terminal 20. In such a case, the regulator senses only battery voltage since the battery is no longer connected to the bridge rectifier terminal 20 with the result that the regulator tends to bias the output Darlington transistors 46 and 44 continuously conductive. Putting it another way, when conductor 30 is disconnected from output terminal 20 battery voltage at the base of transistor 130 will never exceed the reference voltage at the base of transistor 132 with the result that output Darlington transistors 46 and 44 are biased continuously conductive until the output voltage at the F+ terminal reaches 25 volts to breakdown diode 200.

The voltage regulator of this invention is preferably fabricated as an integrated circuit chip that has connections or bumps that are electrically connected respectively to the base of transistor 74, conductor 80, conductor 186, conductor 58, conductor 56, conductor 52, conductor 124 and ground conductor 230.

The operation of the voltage regulator will now be described. When the operator of the motor vehicle closes switch 61 to start the engine, lamp 63 will be energized and the voltage at the F+ terminal will be about 2 or 3 volts due to the voltage drop across lamp 63 which also operates as a resistor. In order to cause the generator to build up its output voltage the field winding 14 must be initially excited from battery 26. In order to provide the proper normal operating reference voltage at junction 108 of the reference voltage developing circuit the voltage on conductor 80 should be at the regulated value of 6.7 volts that is provided by the shunt regulator when the F+ voltage is higher than 6.7 volts. However, when switch 61 is initially closed the voltage at the F+ terminal and conductor 92 is only about 2 to 3 volts so that the voltage on conductor 80 is well below 6.7 volts. In a 12 volt system the divided down representation of battery voltage at junction 72 may be about 4.5 volts and when transistor 74 receives collector voltage from transistor 90, so as to operate as an emitter follower, the voltage at conductor 78 will be about 4 volts. When transistor 90 is biased to cut off, which at times takes place in a manner to be described, the collector of transistor 74 is deprived of collector voltage and the voltage at conductor 78 will drop to about 2 volts. Thus, when transistor 74 has no collector voltage, the voltage at conductor 78 is determined by the voltage at junction 72 applied to a circuit comprised of resistor 64 connected in parallel with a circuit comprised of the base-emitter of transistor 74, resistor 76 and the base-emitter of transistor 192.

When switch 61 is initially closed there is not enough voltage applied to the comparator to cause the Darlington output 46 and 44 to be biased non-conductive and the field is excited from battery 26, closed switch 61, lamp 63, field winding 14, conductor 42 and fully conductive transistors 46 and 44. As the voltage of the generator starts to build up to a point where the voltage on conductor 92 exceeds, for example about 4 volts and if the transistor 90 were allowed to conduct, to apply collector voltage to transistor 74, the voltage at conductor 78 (battery voltage) could exceed the voltage at the emitter of transistor 140 (reference voltage) with the result that the voltage comparator would operate to bias output Darlington 46 and 44 nonconductive which would terminate excitation of the field winding and hence prevent voltage build-up of the generator. In order to prevent this problem the regulator of this invention includes turn-on switching circuitry for causing the output Darlington 46 and 44 to remain biased conductive. This turn-on circuitry includes the PNP 90 transistor which has one of its collectors connected to the collector of transistor 74. Since the voltage on conductor 80 is below 6.7 volts, the voltage required to activate the shunt regulator, transistor 88 will not be conducting so that transistor 90 will be cut-off depriving transistor 74 of collector voltage. As a result of this, the voltage at conductor 78 will be lowered to a point where it will be lower than the voltage at the emitter of transistor 140 and hence the comparator will not cause transistors 46 and 44 to be biased nonconductive until field voltage is sufficient to activate the shunt regulator whereupon normal regulation is possible.

When the generator voltage builds up to a value where the voltage on conductor 86 exceeds 6.7 volts the shunt regulator is activated to maintain substantially 6.7 volts between conductor 80 and ground. The regulator now operates normally to control the on-off switching of output Darlington 46 and 44 in response to a comparison of a representation of battery voltage and reference voltage.

During normal operation the voltage at junction 34 and the F+ terminal is substantially equal to the voltage at junction 28 so that there are substantially equal voltages at the opposite sides of signal lamp 63 and accordingly the lamp is not energized. If the voltage at junction 34 and the F+ terminal drops by a predetermined amount, indicative of an abnormal condition, the signal lamp 63 is energized.

The voltage regulator is preferably mounted within the end frame of the generator and when it is set (conductor 124 grounded) to a temperature compensated mode the base-emitter of transistor 106 responds to the temperature within the generator and accordingly the regulated voltage applied to battery 26 will vary with temperature. This voltage, as previously mentioned, is higher at colder temperatures than it is at warmer temperatures. This tailors the regulated output voltage of the generator to temperature variable charging voltage required by the battery.

By way of example, and not by way of limitation, the resistors of the voltage reference circuit may have the following approximate values:

Resistor 100 . . . 5.50K
Resistor 102 . . . 4.80K
Resistor 104 . . . 10 to 15K
Resistor 112 . . . 6.50K
Resistor 118 . . . 2.00K The resistor values set forth herein are exemplary and can be varied as long as the circuitry performs the functions set forth herein.

The embodiments of the invention in which an exclusive property or privilege is claimed are defined as follows:

1. A reference voltage developing circuit for a voltage regulator for providing a voltage at a junction of said circuit comprising, first and second conductors adapted to be connected across a voltage source, a first circuit connected across said conductors comprising in a series connection a first resistor, a junction connected to said first resistor and a transistor having its collector-emitter circuit connected between said junction and one of said conductors, the base-emitter circuit of said transistor having a temperature responsive characteristic, a second circuit connected between said junction and said one of said conductors comprising in a series connection a second resistor and the current carrying electrodes of a semiconductor switch, said semiconductor switch being so connected with said transistor as to bias said transistor nonconductive while simultaneously connecting said first and second resistors across said conductors when said semiconductor switch is biased conductive whereby when said semiconductor switch is biased conductive the voltage developed at said junction does not vary substantially with changes in temperature of said circuit, said transistor being so connected with said semiconductor switch as to enable said transistor to conduct when said semiconductor switch is biased nonconductive whereby the voltage at said junction varies with changes in temperature of said transistor, said semiconductor switch having a control electrode which is adapted to be controlled so as to selectively cause said semiconductor switch to be biased either conductive or nonconductive.

2. A voltage regulating system for a generator that has a field winding and an output winding that supplies charging voltage to a storage battery comprising, means connecting said output winding and said battery, a first semiconductor switch connected with said field winding and output winding for controlling field current, a voltage sensing circuit connected across said battery having a first junction for developing a battery voltage at said first junction that varies with the voltage across the battery, a reference voltage developing circuit having a second junction connected with said output winding for developing a reference voltage at said second junction, voltage comparator means connected to said junctions for biasing said first semiconductor switch conductive when said reference voltage exceeds said battery voltage and nonconductive when battery voltage exceeds the reference voltage, said reference voltage developing circuit comprising a second semiconductor switch, a transistor having a base-emitter circuit which has a temperature responsive characteristic and voltage divider circuit elements that are so connected to each other and to said second semiconductor switch as to provide a temperature compensated mode of operation wherein the voltage of said second junction varies with temperature or a flat compensated mode of operation wherein the voltage at said second junction does not vary substantially with changes in temperature, said mode of operation being dependent upon the conductive or nonconductive state of said second semiconductor switch, said transistor being biased nonconductive when said regulator is in said flat compensated mode and being biased conductive when the regulator is in the temperature compensated mode, the conductive or nonconductive state of said second semiconductor switch being controlled by whether or not a conductor connected to the control electrode of said second semiconductor switch is connected to or disconnected from said output winding, said reference voltage developing circuit being connected to said output winding while said regulator is in either said temperature compensated mode or said flat compensated mode.

3. A reference voltage developing circuit for a voltage regulator for providing a voltage at a junction of said circuit comprising, first and second conductors adapted to be connected across a voltage source, a first circuit connected across said conductors comprising in a series connection a first resistor, said junction and the collector and emitter electrodes of a first transistor, a second circuit connected between said junction and one of said conductors comprising in a series connection a second resistor and the collector and emitter electrodes of a second transistor, the collector-emitter circuit of said second transistor connected across the base and emitter of said first transistor whereby when said second transistor is biased conductive said first transistor is biased nonconductive and said first and second resistors are connected across said conductors to develop a voltage at said junction that does not vary substantially with changes in temperature, and whereby said first transistor is biased conductive when said second transistor is biased nonconductive to thereby cause the voltage at said junction to vary with temperature due to the temperature responsive characteristic of the base emitter circuit of said first transistor.

4. A reference voltage developing circuit for a voltage regulator for providing a voltage at a junction of said circuit comprising, first and second conductors adapted to be connected across a voltage source, a first circuit connected across said conductors comprising in a series connection a first resistor, said junction, a second resistor and the collector and emitter electrodes of a first NPN transistor, a second NPN transistor having a collector connected to the base of said first transistor and an emitter connected to the emitter of said first transistor, a third resistor connected between said junction and the connection of the collector of said second transistor and the base of said first transistor, a fourth resistor connected across the base and emitter of said first transistor and across the collector and emitter of said second transistor, said second transistor when biased conductive biasing said first transistor nonconductive and connecting said first and third resistors across said conductors whereby the voltage at said junction does not vary substantially with changes in temperature, said first transistor being biased conductive when said second transistor is biased nonconductive and operative to cause the voltage at said junction to vary with changes in temperature over a predetermined temperature range due to the temperature dependent characteristic of the base-emitter circuit of said first transistor.

5. The reference voltage developing circuit according to claim 4 wherein said first transistor is biased into saturation at some predetermined high temperature and is biased to cut-off at some predetermined low temperature whereby at temperatures above said high temperature the voltage of said junction has a constant low value and at temperatures below said low temperature the voltage at said junction has a constant high value.

6. A voltage regulating system for a motor vehicle battery charging generator comprising, an alternating current generator having an output winding and a field winding, rectifier means connected to said output winding having direct voltage output terminals, a battery connected across said output terminals, a circuit for energizing said field winding connected to said output winding comprising a semiconductor switch connected in series with said field winding and a resistor connected in series with said field winding and semiconductor switch, a voltage sensing circuit connected across said battery for sensing the voltage across said battery, means connected to said sensing circuit and responsive to the voltage across said battery for biasing said semiconductor switch fully conductive when the voltage across the battery is below a regulated value and biasing said semiconductor switch fully nonconductive when the voltage across the battery is above the regulated value, means responsive to a disconnection of said sensing circuit from said battery for biasing said semiconductor switch continuously fully nonconductive, and means operative in response to the voltage developed across said resistor exceeding a predetermined value indicative of excessive field current for biasing said semiconductor switch such that the conduction of said switch is reduced from its fully conductive condition to a current limit value.

7. A voltage regulating system for an alternating current generator that supplies the electrical loads on a motor vehicle including charging the storage battery comprising, an alternating current generator having an output winding and a field winding, rectifier means connected to said output winding having direct voltage output terminals connected to said battery, a field circuit for energizing said field winding connected to said output winding including a semiconductor switch connected in series with said field winding that is biased conductive and nonconductive, a voltage dividing circuit connected across said battery having a battery voltage junction that has a voltage that is a function of battery voltage, a reference voltage generating circuit comprising a reference voltage divider having a reference voltage junction that develops a reference voltage that is a function of the voltage applied to said reference voltage divider, a voltage comparator connected to said junctions for biasing said semiconductor switch fully conductive when the voltage of said battery junction is below the voltage of said reference junction and biasing said semiconductor switch nonconductive when the voltage of said battery junction is higher than the voltage of said reference voltage junction, means connecting said output winding to a conductor means that feeds said voltage reference generating circuit, said conductor means being connected to said field winding to energize said field winding from said conductor means when said semiconductor switch is biased conductive, a circuit for initially exciting said field winding from said battery to cause generator voltage build-up comprising a manually operable switch and resistor means connected in series between said battery and said conductor means, said switch when initially closed causing a voltage to be applied to said conductor means through said resistor means that is of such a value that the voltage at said battery voltage junction is higher than the voltage at said reference voltage junction, and means operative when the output voltage of said generator is building up and is below a predetermined value for preventing the higher voltage at said battery voltage junction relative to said reference voltage junction from biasing said semiconductor switch nonconductive.

8. A voltage regulating system for a motor vehicle battery charging generator comprising, an alternating current generator having an output winding and a field winding, rectifier means connected to said output winding having direct voltage output terminals, a battery connected across said output terminals, a circuit for energizing said field winding connected to said output winding comprising a semiconductor switch connected in series with said field winding and a resistor connected in series with said field winding and semiconductor switch, a voltage sensing circuit connected across said battery for sensing the voltage across said battery, means connected to said sensing circuit and responsive to the voltage across said battery for biasing said semiconductor switch fully conductive when the voltage across the battery is below a regulated value and biasing said semiconductor switch fully nonconductive when the voltage across the battery is above the regulated value, and means operative in response to the voltage developed across said resistor exceeding a predetermined value indicative of excessive field current for biasing said semiconductor switch such that the conduction of said switch is reduced from its fully conductive condition to a current limit value, said last-named means comprising a voltage multiplier that has a transistor, the temperature response of said transistor being similar to the negative temperature coefficient characteristic of the current flowing through said field coil.

* * * * *